US008806121B2

(12) United States Patent
Chavda et al.

(10) Patent No.: US 8,806,121 B2
(45) Date of Patent: *Aug. 12, 2014

(54) INTELLIGENT STORAGE PROVISIONING WITHIN A CLUSTERED COMPUTING ENVIRONMENT

(71) Applicant: International Business Machines Corporation, Armonk, NY (US)

(72) Inventors: Kavita Chavda, Roswell, GA (US); David P. Goodman, Longmont, CO (US); Sandeep Gopisetty, Morgan Hill, CA (US); Seshashayee S. Murthy, Yorktown Heights, NY (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,158

(22) Filed: Jun. 18, 2013

(65) Prior Publication Data

US 2013/0282910 A1    Oct. 24, 2013

Related U.S. Application Data

(63) Continuation of application No. 12/831,455, filed on Jul. 7, 2010, now Pat. No. 8,489,809.

(51) Int. Cl.
*G06F 13/00* (2006.01)
(52) U.S. Cl.
USPC .......................... 711/112; 711/148; 711/152
(58) Field of Classification Search
CPC ....... G06F 3/06; G06F 3/0604; G06F 3/0605; G06F 3/0607; G06F 3/0611; G06F 3/0647; G06F 3/0653; G06F 3/067; G06F 3/0664; G06F 3/0665; G06F 3/0685; G06F 12/0868
USPC ......... 711/112, 114, 148, 152, 154, 158, 161, 711/162, 165, 206
See application file for complete search history.

(56) References Cited

U.S. PATENT DOCUMENTS 5,163,131 A    11/1992    Row et al.
7,124,242 B2   10/2006    Miki
(Continued)

OTHER PUBLICATIONS

Mell et al., "The NIST Definition of Cloud Computing", National Institute of Standards and Technology, Information Technology Laboratory, Version 15, Oct. 7, 2009, 2 pages.
(Continued)

*Primary Examiner* — Tuan Thai
*Assistant Examiner* — Zhou Li
(74) *Attorney, Agent, or Firm* — William E. Schiesser; Keobane & D'Alessandro, PLLC

(57) ABSTRACT

Embodiments of the present invention provide an approach for intelligent storage planning and planning within a clustered computing environment (e.g., a cloud computing environment). Specifically, embodiments of the present invention will first determine/identify a set of storage area network volume controllers (SVCs) that is accessible from a host that has submitted a request for access to storage. Thereafter, a set of managed disk (mdisk) groups (i.e., corresponding to the set of SVCs) that are candidates for satisfying the request will be determined. This set of mdisk groups will then be filtered based on available space therein, a set of user/requester preferences, and optionally, a set of performance characteristics. Then, a particular mdisk group will be selected from the set of mdisk groups based on the filtering.

20 Claims, 6 Drawing Sheets

(56) References Cited

U.S. PATENT DOCUMENTS

| | | |
|---|---|---|
| 7,197,576 B1 | 3/2007 | Lo et al. |
| 7,257,694 B2 | 8/2007 | Serizawa et al. |
| 7,356,477 B1 | 4/2008 | Allan et al. |
| 7,434,017 B2 | 10/2008 | Maruyama et al. |
| 7,441,009 B2 | 10/2008 | Shinohara |
| 7,523,273 B2 | 4/2009 | Gusler et al. |
| 7,849,262 B1 | 12/2010 | Glade et al. |
| 8,151,047 B2 | 4/2012 | Nakagawa et al. |
| 8,447,920 B1 * | 5/2013 | Syu .............................. 711/103 |
| 2002/0013832 A1 | 1/2002 | Hubbard |
| 2004/0054866 A1 | 3/2004 | Blumenau et al. |
| 2004/0260875 A1 | 12/2004 | Murotani et al. |
| 2006/0101204 A1 | 5/2006 | Bao |
| 2007/0055713 A1 | 3/2007 | Nagai et al. |
| 2008/0147973 A1 | 6/2008 | Gruttadauria et al. |
| 2008/0148270 A1 | 6/2008 | Gopisetty et al. |
| 2008/0244181 A1 | 10/2008 | Walz et al. |
| 2008/0301332 A1 | 12/2008 | Butler et al. |
| 2008/0301333 A1 | 12/2008 | Butler et al. |
| 2010/0050172 A1 | 2/2010 | Ferris |
| 2010/0057913 A1 | 3/2010 | Dehaan |
| 2010/0057949 A1 | 3/2010 | Weber |
| 2010/0058332 A1 | 3/2010 | Dehaan |
| 2010/0094652 A1 | 4/2010 | Dorsett |
| 2011/0246740 A1 | 10/2011 | Yata et al. |
| 2012/0110260 A1 | 5/2012 | Chavda et al. |

OTHER PUBLICATIONS

Maitland, J., "Keeping Control Isn't Easy", Chapter 4: Cloud-Based Infrastructure, SearchCloudComputing.com, 13 pages. No publication date.

Deen, B. et al., "Help for MARSATOTIE", jpl.nasa.gov, Sep. 2006, http://www-mipl.jpl.nasa.gov/vicar/dev/html/vichelp/marsautotie.html.

Chakeres, I. D. et al., "Perceptive Admission Control for Wireless Network Quality of Service", preprint submitted to Elsevier Science, Jun. 22, 2006.

Zhou, Y. et al., "Utility-Based Load balancing in WLAN/UMTS Internetworking Systems", www.seas.gwu.edu (no publication date).

Zhuo H. Li, USPTO Office Action, U.S. Appl. No. 12/831,455, Mail Date Sep. 26, 2012, 15 pages.

Zhuo H. Li, USPTO Notice of Allowance and Fee(s) Due, U.S. Appl. No. 12/831,455, 17 pages.

* cited by examiner

INTELLIGENT STORAGE PROVISIONING WITHIN A CLUSTERED COMPUTING ENVIRONMENT

RELATED U.S. APPLICATION DATA

The present patent document is a continuation of U.S. patent application Ser. No. 12/831,455, filed Jul. 7, 2010, entitled "INTELLIGENT STORAGE PROVISIONING WITHIN A CLUSTERED COMPUTING ENVIRONMENT", the disclosure of which is incorporated herein by reference.

TECHNICAL FIELD

The present invention generally relates to a clustered computing environment such as a cloud computing environment. Specifically, the present invention relates to intelligent storage provisioning within a clustered computing environment.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices, networks, business applications and other software, and the like.

Storage clouds often rely on virtualized storage in order to provide a dynamic easy-to-manage storage infrastructure. However, provisioning this virtual storage is challenging as it potentially involves multiple heterogeneous storage subsystems with different capabilities. Typical solutions use either complex device modeling (which works for only a few types of subsystems) or use static allocation by pre-provisioning storage across workloads. Both approaches are inadequate for a cloud environment.

SUMMARY

Embodiments of the present invention provide an approach for intelligent storage planning and provisioning within a clustered computing environment (e.g., a cloud computing environment). Specifically, embodiments of the present invention will first determine/identify a set of storage area network volume controllers (SVCs) that is accessible from a host that has submitted a request for access to storage. Thereafter, a set of managed disk (mdisk) groups (i.e., corresponding to the set of SVCs) that are candidates for satisfying the request will be determined. This set of mdisk groups will then be filtered based on available space therein, a set of user/requester preferences, and optionally a set of performance characteristics. Then, a particular mdisk group will be selected from the set of mdisk groups based on the filtering.

A first aspect of the present invention provides a method for storage provisioning in a clustered computing environment, comprising: determining a set of storage area network volume controllers (SVCs) within the clustered computing environment that is accessible from a host submitting a request for access to storage; determining a set of managed disk (mdisk) groups corresponding to the set of SVCs that are candidates for fulfilling the request; filtering the set of mdisk groups based on available space therein and a set of user preferences; and identifying a particular mdisk group from the set of mdisk groups based on the filtering.

A second aspect of the present invention provides a system for storage provisioning in a clustered computing environment, comprising: a bus; a processor coupled to the bus; and a memory medium coupled to the bus, the memory medium comprising instructions to: determine a set of storage area network volume controllers (SVCs) within the clustered computing environment that is accessible from a host submitting a request for access to storage; determine a set of managed disk (mdisk) groups corresponding to the set of SVCs that are candidates for fulfilling the request; filter the set of mdisk groups based on available space therein and a set of user preferences; and identify a particular mdisk group from the set of mdisk groups based on the filtering.

A third aspect of the present invention provides a computer program product for storage provisioning in a clustered computing environment, the computer program product comprising a computer readable storage media, and program instructions stored on the computer readable storage media, to: determine a set of storage area network volume controllers (SVCs) within the clustered computing environment that is accessible from a host submitting a request for access to storage; determine a set of managed disk (mdisk) groups corresponding to the set of SVCs that are candidates for fulfilling the request; filter the set of mdisk groups based on available space therein and a set of user preferences; and identify a particular mdisk group from the set of mdisk groups based on the filtering.

A fourth aspect of the present invention provides a method for storage provisioning in a clustered computing environment, comprising: providing a computer infrastructure having functionality to: determine a set of storage area network volume controllers (SVCs) within the clustered computing environment that is accessible from a host submitting a request for access to storage; determine a set of managed disk (mdisk) groups corresponding to the set of SVCs that are candidates for fulfilling the request; filter the set of mdisk groups based on available space therein and a set of user preferences; and identify a particular mdisk group from the set of mdisk groups based on the filtering.

BRIEF DESCRIPTION OF THE DRAWINGS

These and other features of this invention will be more readily understood from the following detailed description of the various aspects of the invention taken in conjunction with the accompanying drawings in which.

Figure 1:
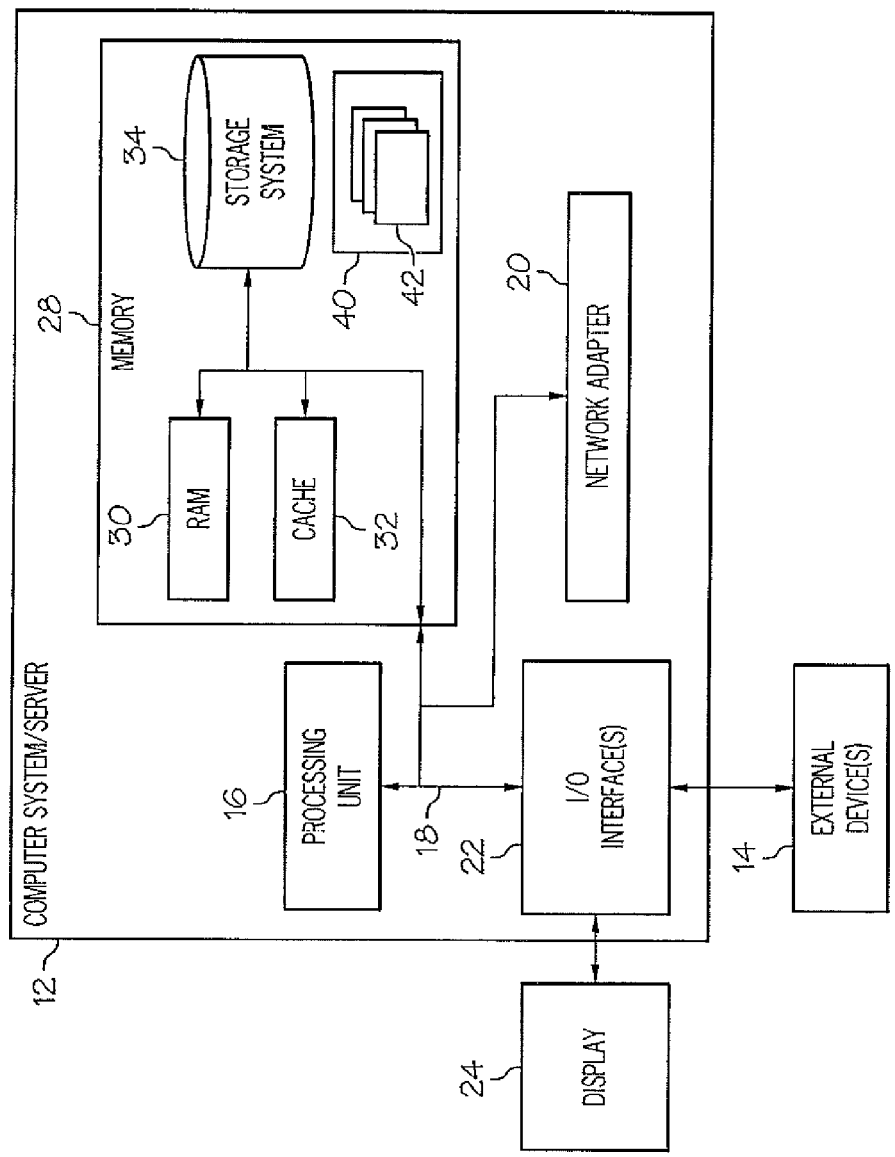
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of clustered computing environment now known or later developed.

In any event, as indicated above, embodiments of the present invention provide an approach for intelligent storage planning and planning within a clustered computing environment (e.g., a cloud computing environment). Specifically, embodiments of the present invention will first determine/identify a set of storage area network volume controllers (SVCs) that is accessible from a host that has submitted a request for access to storage. Thereafter, a set of managed disk (mdisk) groups (i.e., corresponding to the set of SVCs) that are candidates for satisfying the request will be determined. This set of mdisk groups will then be filtered based on available space therein, a set of user/requester preferences, and optionally a set of performance characteristics. Then, a particular mdisk group will be selected from the set of mdisk groups based on the filtering.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, Redundant Array of Independent Disks (RAID) systems, tape drives, and data archival storage systems, etc.

Figure 2:
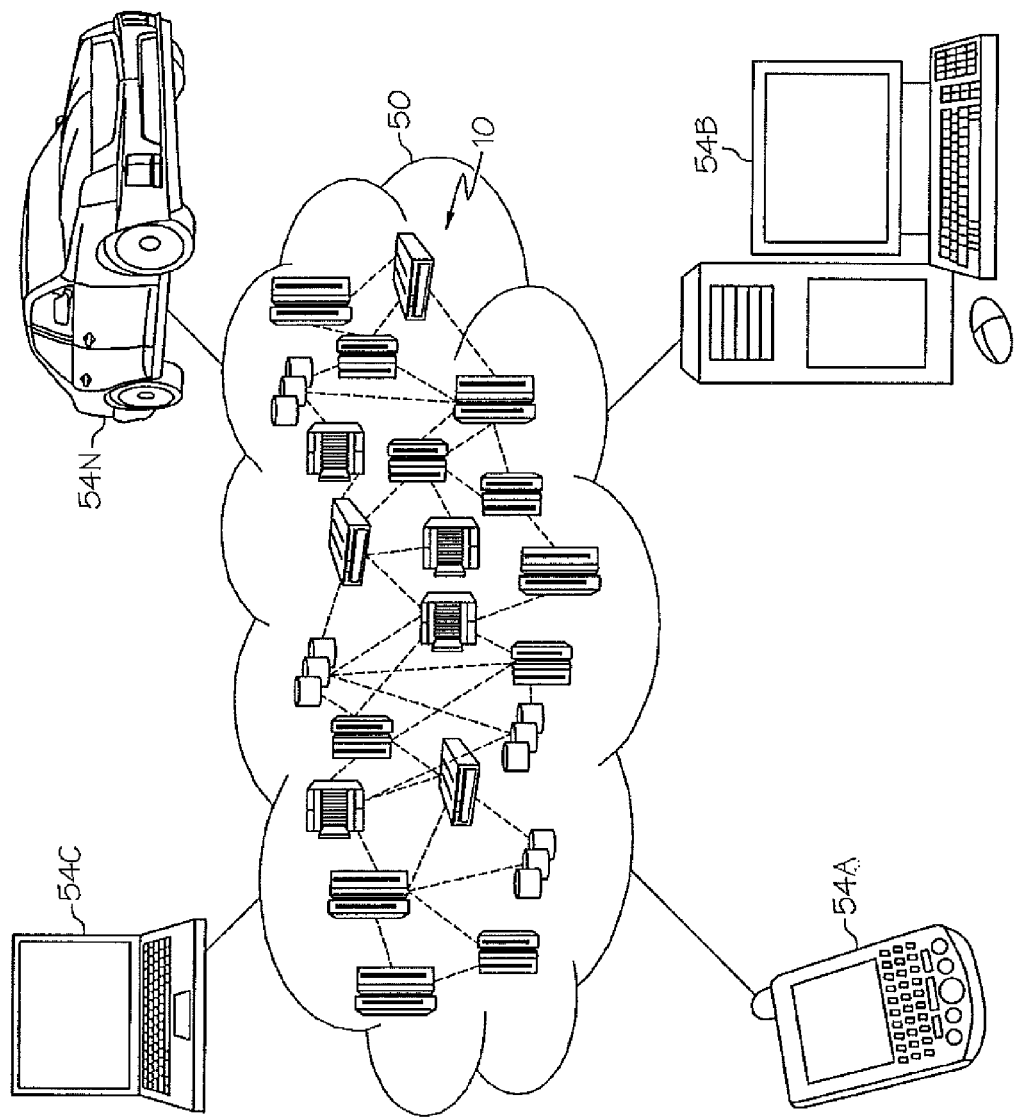
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
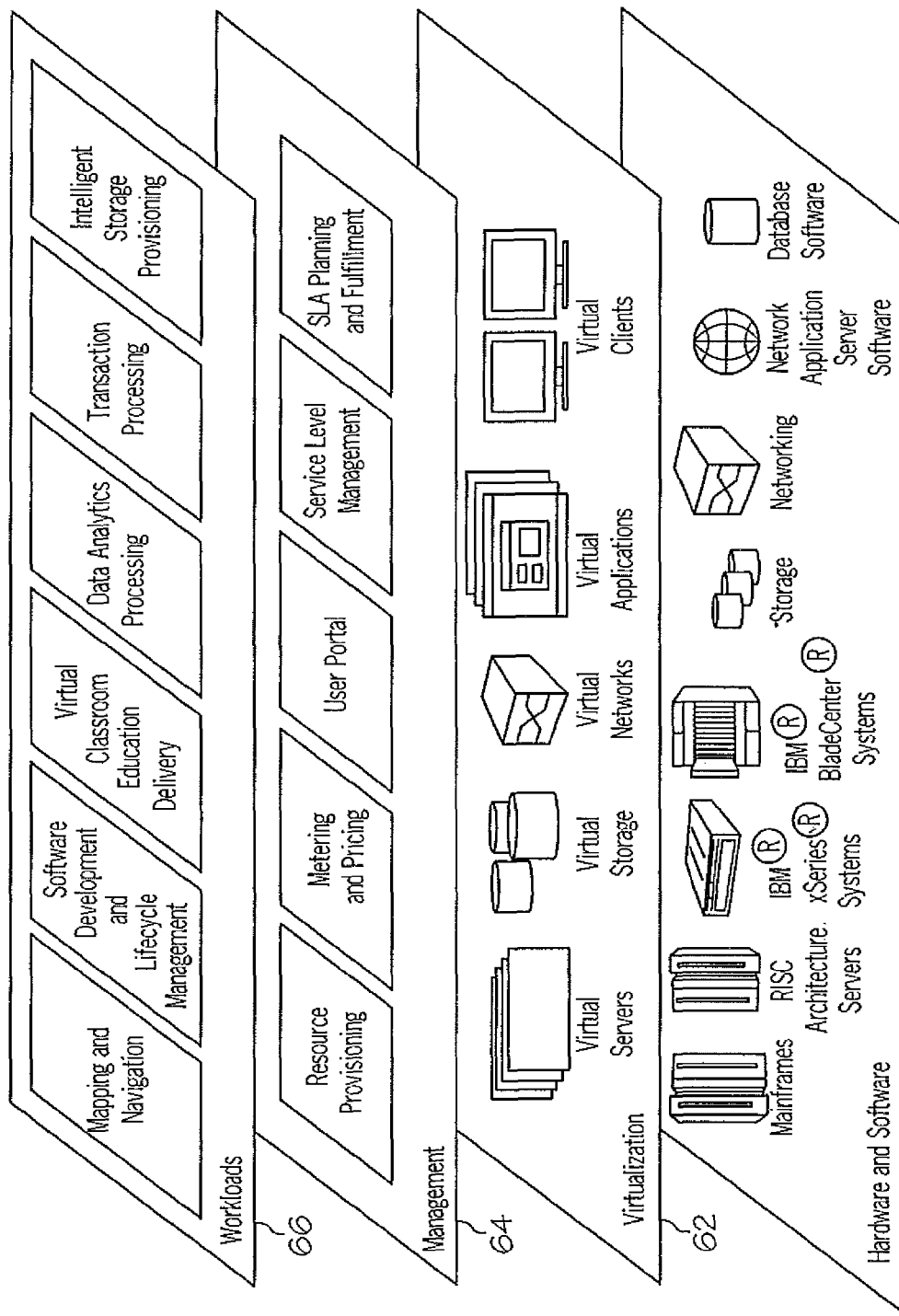
FIG. 3 depicts cloud abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and intelligent storage provisioning.

It is understood all functions of the present invention as described herein are typically performed by the intelligent storage provisioning function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 2.

Figure 4:
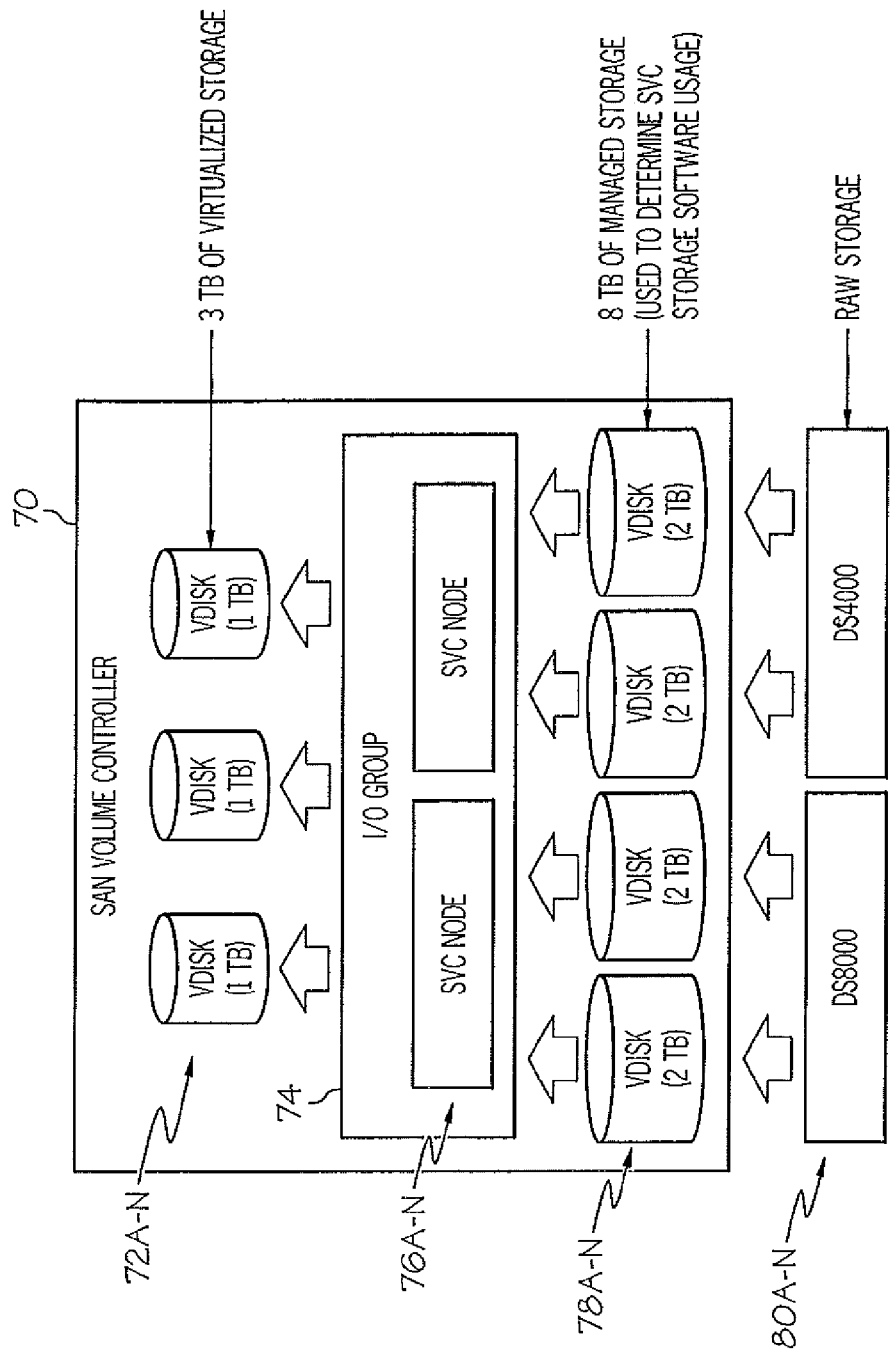
FIG. 4 depicts a set of storage area network volume controllers (SVCs) according to an embodiment of the present invention.

Referring now to FIG. 4, a set of storage area network volume controllers (SVCs) 70 according to an embodiment of the present invention is shown. As depicted, SVC 70 includes a set (at least one) of virtual storage disks (vdisks) 72A-N; an I/O group 74 that includes a set of SVC nodes 76A-N, and a set of managed storage disks (mdisks) 78A-N that are fed by raw storage blocks 80A-N. Under embodiments of the present invention, SVC 70 will be leveraged to provide intelligent storage provisioning. It is understood that any numbers/values (e.g., 1 TB) are for illustrative purposes only and are not intended to me limiting.

Figure 5:
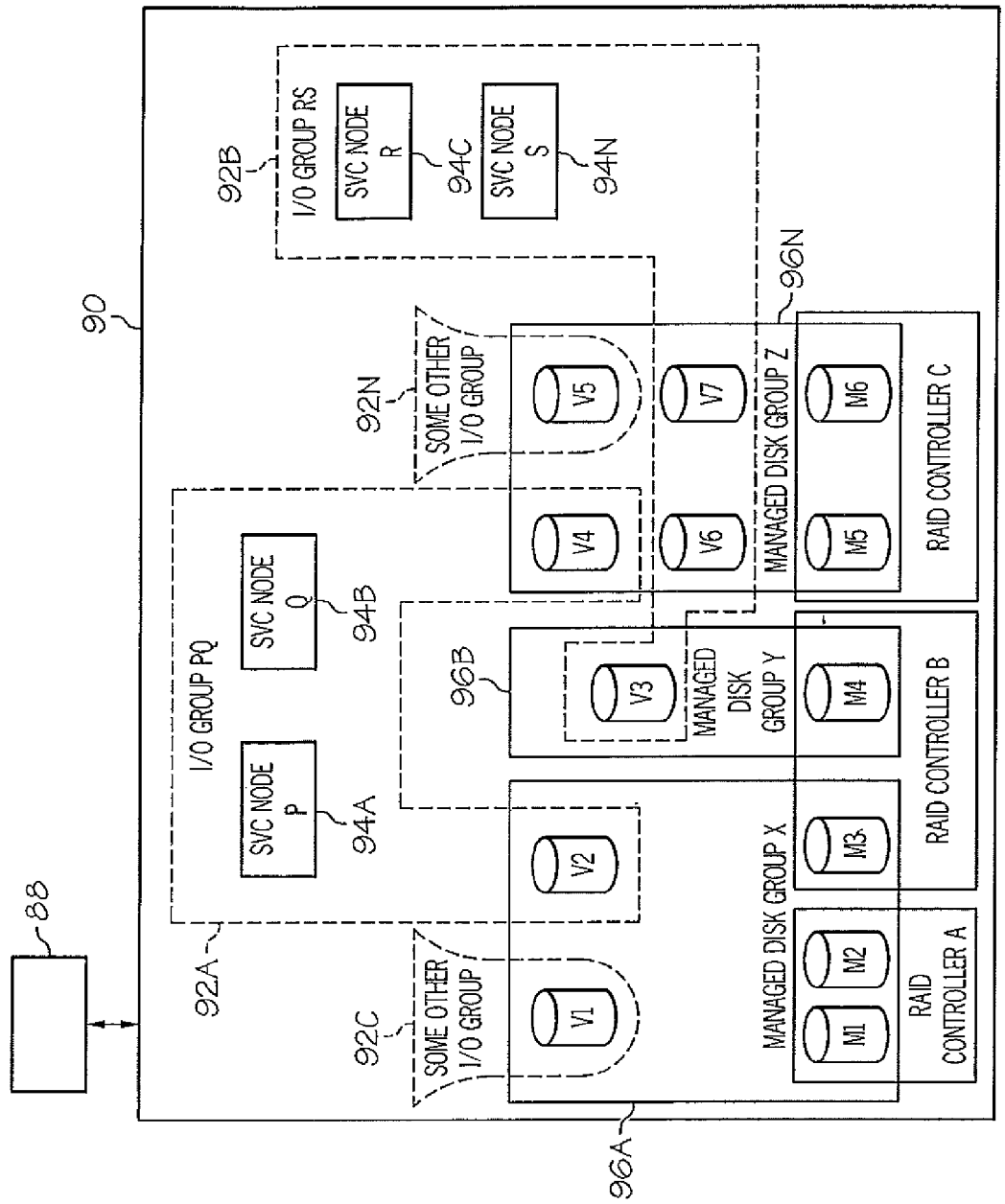
FIG. 5 depicts the selection of a managed (mdisk) group according to an embodiment of the present invention.

Referring now to FIG. 5, these concepts will be explained in further detail. Under embodiments of the present invention, a particular mdisk group 96A-N will be identified for storing data. However, as depicted, embodiments of the present invention provide a set of I/O groups 92A-N. As further shown, I/O groups (e.g., I/O groups 92A-B) can comprise one or more SVC nodes 94A-N. Regardless, each I/O group typically comprises a set of vdisks V1-V7. Still yet, each mdisk group 96A-N is typically RAID controlled and comprises a set of mdisks M1-M6.

In a typical embodiment, SVC 90 resides within a clustered computing environment such as cloud computing environment 50 (FIG. 2). Along these lines, it will first be determined whether SVC 90 is accessible from a host 88 that is submitting a request for access to storage. It should be understood that although a single SVC 90 is shown in FIG. 5, this need not be the case. Rather, the teachings recited herein are intended to apply to an environment having any quantity of accessible SVCs (e.g., at least one or a "set"). Regardless, assuming in this example that SVC 90 is in fact accessible to host 88, a set of managed disk (mdisk) groups 96A-N that are candidates for fulfilling the request will then be determined/identified. To determine which mdisk group will be used to service the request, a filtering operation is performed. Specifically, the set of mdisk groups 96A-N will be filtered based on available space therein and a set of user preferences. The set of user preferences typically comprise at least one of the following: a desired storage type, a desired RAID level, a desired cost constraint, or a storage mirroring availability.

Based on this filtering, a particular mdisk group from the set of mdisk groups will attempt to be identified. If there are none, a message indicating as much will be communicated to the user. If there are more than one mdisk groups remaining as a potential candidate, then the filtering could be continued based on performance characteristics of each of the set of mdisk groups. In a typical embodiment, performance characteristics comprise at least one of the following: a speed of each of the set of mdisk groups 96A-N, a busy-ness metric of each of the set of mdisk groups 96A-N, or a load on each of the set of mdisk groups 96A-N.

In filtering based on performance characteristics, the following filtering rules could be implemented:
    Consider/filter based upon the speed of candidates and remove candidates falling below a particular performance threshold from consideration
    Keep all candidate mdisk groups 96A-N whose response time is within a factor (e.g., 2×) of the minimum response time candidate.

Keep all candidate mdisk groups 96A-N whose response time is less than a certain chosen threshold (e.g., 100 ms).

Eliminate the remaining mdisk groups 96A-N (i.e., relative as well as absolute measure).

At least one candidate will remain after this step.

Consider the load on an mdisk group

Eliminate any mdisk group having a load percentage beyond a predetermined load threshold (e.g., 75%).

Compute and consider a busy-ness metric using factors such as in the following task and service time example:

Number of tasks received per hour (tasks/hour).

Average service time for each task (mins/task).

Number of tasks/hour*avg. service time/task=No. of mins/hour he is busy.

E.g., 4 tasks/hour 0.1 hours/task=>busy-ness factor=0.4.

I/O rates with respect to read and/or wrote operations. (e.g. (ReadIORate*ReadIoResponseTime)+(WriteIORate*WriteResponseTime).

I/O rates in I/O operations/sec and response times are in milliseconds/operation.

Mdisk groups 96A-N with queuing delays get penalized more.

In a typical embodiment, the performance characteristic-based filtering should further pare down the number of candidate mdisk groups 96A-N until a single mdisk group is revealed. When this occurs, the single mdisk group will be identified and used to fulfill/satisfy the host 88's request(s).

Figure 6:
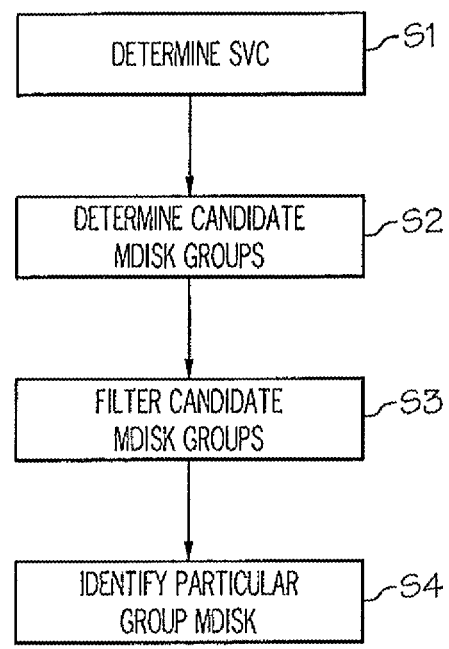
FIG. 6 depicts a method flow diagram according to an embodiment of the present invention.

Referring now to FIG. 6, a method flow diagram according to an embodiment of the present invention is shown. As depicted, in step S1, a set of storage area network volume controllers (SVCs) that is accessible from a host submitting a request for access to storage will be determined/identified. In step S2, a set of managed disk (mdisk) groups corresponding to the set of SVCs that are candidates for fulfilling the request will be determined. In step S3, the set of mdisk groups will be filtered (e.g., based on space, user preferences, and, if needed, performance characteristics), and in step S4, a particular mdisk group from the set of mdisk groups based on the filtering.

While shown and described herein as an intelligent storage provisioning solution, it is understood that the invention further provides various alternative embodiments. For example, in one embodiment, the invention provides a computer-readable/useable medium that includes computer program code to enable a computer infrastructure to provide intelligent storage provisioning functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide intelligent storage provisioning. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing intelligent storage provisioning functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for storage provisioning in a clustered computing environment, comprising:

determining a set of storage area network volume controllers (SVCs) within the clustered computing environment that is accessible from a host submitting a request for access to storage;

determining a set of managed disk (mdisk) groups corresponding to the set of SVCs that are candidates for fulfilling the request;

performing a first filtering operation on the set of mdisk groups based on available space therein and a set of user preferences;

if more than one mdisk group corresponding to the set of SVCs that are candidates remains after the first filtering operation, performing a second filtering operation on the set of mdisk groups based on a set of performance characteristics, and identifying the one mdisk group from the set of mdisk groups based on the second filtering to which to provision the request for access to storage; and if one mdisk group remains after the first filtering operation, identifying the one mdisk group from the set of mdisk groups based on the first filtering operation to which to provision the request for access to storage.

2. The method of claim 1, the set of user preferences comprising at least one of the following: a desired storage type or a desired RAID level.

3. The method of claim 1, the set of user preferences comprising at least one of the following: a desired cost constraint or a storage mirroring availability.

4. The method of claim 1, the filtering being further based on a set of performance characteristics.

5. The method of claim 4, the set of performance characteristics comprising at least one of the following: a speed of each of the set of mdisk groups, a busy-ness metric of each of the set of mdisk groups, or a load on each of the set of mdisk groups.

6. The method of claim 1, the busy-ness metric being based on input/output (I/O) rates corresponding to each of the set of mdisk groups.

7. The method of claim 1, the clustered computing environment comprising a cloud computing environment.

8. The method of claim 1, wherein a service solution provider provides a computer infrastructure that performs the method for one or more consumers.

9. A system for storage provisioning in a clustered computing environment, comprising:
- a bus;
- a processor coupled to the bus; and
- a memory medium coupled to the bus, the memory medium comprising instructions to:
  - determine a set of storage area network volume controllers (SVCs) within the clustered computing environment that is accessible from a host submitting a request for access to storage;
  - determine a set of managed disk (mdisk) groups corresponding to the set of SVCs that are candidates for fulfilling the request;
  - perform a first filtering operation on the set of mdisk groups based on available space therein and a set of user preferences;
  - if more than one mdisk group corresponding to the set of SVCs that are candidates remains after the first filtering operation, perform a second filtering operation on the set of mdisk groups based on a set of performance characteristics, and identify the one mdisk group from the set of mdisk groups based on the second filtering to which to provision the request for access to storage;
  - if one mdisk group remains after the first filtering operation, identifying the one mdisk group from the set of mdisk groups based on the first filtering operation to which to provision the request for access to storage.

10. The system of claim 9, the set of user preferences comprising at least one of the following: a desired storage type, a desired RAID level, a desired cost constraint, or a storage mirroring availability.

11. The system of claim 9, the memory medium further comprising instructions to provision the request for access to storage to the one mdisk group.

12. The system of claim 11, the set of performance characteristics comprising at least one of the following: a speed of each of the set of mdisk groups, or a load on each of the set of mdisk groups.

13. The system of claim 9, the clustered computing environment comprising a cloud computing environment.

14. The system of claim 9, each of set of SVC comprising:
- a set of virtual disks (vdisks);
- a I/O group having a set of SVC nodes; and
- a set of mdisk groups.

15. A computer program product for storage provisioning in a clustered computing environment, the computer program product comprising a non-transitory computer readable storage media, and program instructions stored on the non-transitory computer readable storage media, to:
- determine a set of storage area network volume controllers (SVCs) within the clustered computing environment that is accessible from a host submitting a request for access to storage;
- determine a set of managed disk (mdisk) groups corresponding to the set of SVCs that are candidates for fulfilling the request;
- perform a first filtering operation on the set of mdisk groups based on available space therein and a set of user preferences;
- if more than one mdisk group corresponding to the set of SVCs that are candidates remains after the first filtering operation, perform a second filtering operation on the set of mdisk groups based on a set of performance characteristics, and identify the one mdisk group from the set of mdisk groups based on the second filtering to which to provision the request for access to storage;
- if one mdisk group remains after the first filtering operation, identifying the one mdisk group from the set of mdisk groups based on the first filtering operation to which to provision the request for access to storage.

16. The computer program product of claim 15, the set of user preferences comprising at least one of the following: a desired storage type, a desired RAID level, a desired cost constraint, or a storage mirroring availability.

17. The computer program product of claim 15, further comprising program instructions stored on the non-transitory computer readable storage media to provision the request for access to storage to the one mdisk group.

18. The computer program product of claim 17, the set of performance characteristics comprising at least one of the following: a speed of each of the set of mdisk groups, or a load on each of the set of mdisk groups.

19. The computer program product of claim 15, the clustered computing environment comprising a cloud computing environment.

20. The computer program product of claim 15, each of set of SVC comprising:
- a set of virtual disks (vdisks);
- a I/O group having a set of SVC nodes; and
- a set of mdisk groups.

* * * * *